(12) United States Patent  (10) Patent No.: US 9,202,035 B1
Manusov et al.  (45) Date of Patent: Dec. 1, 2015

(54) USER AUTHENTICATION BASED ON BIOMETRIC HANDWRITING ASPECTS OF A HANDWRITTEN CODE

(71) Applicant: EMC Corporation, Hopkinton, MA (US)

(72) Inventors: Yuri Manusov, Beer-Sheva (IL); Yedidya Dotan, Newton, MA (US); Oleg Freylafert, Hod Hasharon (IL); Anton Khitrenovich, Kfar-Yona (IL)

(73) Assignee: EMC Corporation, Hopkinton, MA (US)

( * ) Notice: Subject to any disclaimer, the term of this patent is extended or adjusted under 35 U.S.C. 154(b) by 6 days.

(21) Appl. No.: 14/132,730

(22) Filed: Dec. 18, 2013

(51) Int. Cl.
G06F 21/00 (2013.01)
G06F 21/32 (2013.01)
G06F 21/36 (2013.01)

(52) U.S. Cl.
CPC ............... *G06F 21/32* (2013.01); *G06F 21/36* (2013.01)

(58) Field of Classification Search
None
See application file for complete search history.

(56) References Cited

U.S. PATENT DOCUMENTS

| | | | |
|---|---|---|---|
| 6,976,165 B1 | 12/2005 | Carpentier et al. | |
| 8,261,066 B2 | 9/2012 | Carpentier et al. | |
| 8,564,453 B1 | 10/2013 | Morneau et al. | |
| 8,631,475 B1 | 1/2014 | O'Malley et al. | |
| 8,756,666 B1 | 6/2014 | Silva et al. | |
| 8,856,954 B1 | 10/2014 | Hathaway et al. | |
| 2010/0011428 A1* | 1/2010 | Atwood et al. | 726/7 |

* cited by examiner

*Primary Examiner* — Ghazal Shehni
(74) *Attorney, Agent, or Firm* — BainwoodHuang (57) ABSTRACT

A technique authenticates a user. The technique involves receiving, by processing circuitry, a handwritten code. The technique further involves performing, by the processing circuitry, a set of assessment operations which includes (i) a handwriting evaluation to analyze a set of biometric handwriting aspects of the handwritten code and (ii) a code evaluation to analyze code accuracy of the handwritten code. The technique further involves providing, by the processing circuitry, an authentication result based on the set of assessment operations. Such a technique strengthens security by including a "who you are" factor (i.e., handwriting biometrics uniquely identify the genuine user).

22 Claims, 6 Drawing Sheets

USER AUTHENTICATION BASED ON BIOMETRIC HANDWRITING ASPECTS OF A HANDWRITTEN CODE

BACKGROUND

One conventional approach to controlling access to a sensitive resource requires a human to (i) enter a personal identification number (PIN) into the human's authentication token, and then (ii) provide a one-time use passcode (OTP) from the human's authentication token to prove that the human is authentic (i.e., not a fraudster). If the provided OTP matches an expected OTP, the human is granted access to the sensitive resource. If the provided OTP does not match the expected OTP, the human is denied access to the sensitive resource.

Accordingly, the above-identified conventional access control approach requires the human to be in possession of two different types of authentication factors. In particular, the human must provide a PIN, i.e., the human provides a "what you know" factor (the human knows the PIN). Additionally, the human must provide a OTP from the human's authentication token, i.e., the human provides a "what you have" factor (the human has the authentication token).

SUMMARY

Unfortunately, there are deficiencies to the above-described conventional approach to controlling access to a sensitive resource. For example, a malicious person can steal the authentication token from the human and, if the malicious person knows the human's PIN, enter the PIN into the human's authentication token and obtain the OTP. Once the malicious person has the OTP, the malicious person is able to access the sensitive resource.

In contrast to the above-described conventional approach to controlling access to a sensitive resource, improved techniques are directed to authenticating a user based on a handwriting evaluation which analyzes a set of biometric handwriting aspects of a handwritten code provided by the user. For example, the user can provide a PIN or a OTP by entering a series of user movements into an electronic touch screen (i.e., drawing the PIN or OTP on the surface of the touch screen). The value of the PIN or OTP can be evaluated as part of the authentication process. Additionally, the series of user movements is evaluated from a biometric perspective (e.g., screen coordinate locations, drawing pressure, drawing speed, acceleration, etc.) to determine whether the user is authentic or a fraudster. Accordingly, the improved techniques incorporate a "who you are" factor into the authentication process.

One embodiment is directed to a method of authenticating a user. The method includes receiving, by processing circuitry, a handwritten code. The method further includes performing, by the processing circuitry, a set of assessment operations which includes (i) a handwriting evaluation to analyze a set of biometric handwriting aspects of the handwritten code and (ii) a code evaluation to analyze code accuracy of the handwritten code. The method further includes providing, by the processing circuitry, an authentication result based on the set of assessment operations. Such a method strengthens security by including a "who you are" factor (i.e., handwriting biometrics uniquely identify the genuine user).

In some arrangements, receiving the handwritten code includes obtaining, as the handwritten code, a set of touch screen parameters from an electronic touch screen (or pad) which concurrently displays a writing surface and prompts a user to write on the writing surface. The electronic touch screen can reside on a mobile device such as a smart phone, a tablet, a personal assistant, etc. Additionally, the user can write on the electronic touch screen with a finger, a stylus, another manual drawing tool, and so on.

In some arrangements, obtaining the set of touch screen parameters includes sensing manually provided drawing gestures made by the user on the writing surface, and converting the manually provided drawing gestures into the set of touch screen parameters.

In some arrangements, the set of touch screen parameters defines a current set of user movement characteristics. In these arrangements, performing the set of assessment operation includes extracting a current set of user biometrics from the current set of user movement characteristics and, based on a comparison between the current set of user biometrics and an expected set of user biometrics, generating a handwriting evaluation result indicating whether the user is authentic or a fraudster from a biometrics perspective.

In some arrangements, the set of touch screen parameters further defines a current set of screen locations. In these arrangements, performing the set of assessment operation further includes performing a character recognition operation on the current set of screen locations to derive a current personal identification number (PIN) and, based on a comparison between the current PIN and an expected PIN, generating a code evaluation result to indicate whether the user is authentic or a fraudster from a code accuracy perspective (i.e., whether the current PIN matches the expected PIN).

In some arrangements, the authentication result indicates successful authentication in response to both (i) the handwriting evaluation result indicating that the user is authentic from the biometrics perspective and (ii) the code evaluation result indicating that the user is authentic from the code accuracy perspective. In these arrangements, the method further includes, in response to the authentication result indicating successful authentication, providing a valid one-time use passcode (OTP) to the user to enable the user to access to a set of protected resources using the OTP.

In some arrangements, the authentication result indicates unsuccessful authentication in response to at least one of (i) the handwriting evaluation result indicating that the user is not authentic from the biometrics perspective and (ii) the code evaluation result indicating that the user is not authentic from the code accuracy perspective. In these arrangements, the method further includes, in response to the authentication result indicating unsuccessful authentication, providing a fake (or invalid) one-time use passcode (OTP) to the user to prevent a fraudster from determining that authentication was unsuccessful. Accordingly, the fraudster can be confused or tricked into thinking that authentication was successful to make it more difficult for the fraudster to defeat security as well as to provide more opportunity to gather information from the fraudster.

In some arrangements, the set of touch screen parameters further defines a current set of screen locations. In these arrangements, performing the set of assessment operation further includes performing a character recognition operation on the current set of screen locations to derive a current one-time use passcode (OTP) which was outputted by an authentication token of assigned to the user and, based on a comparison between the current OTP and an expected OTP, generating a code evaluation result to indicate whether the user is authentic or a fraudster from a code accuracy perspective (i.e., whether the current OTP matches the expected OTP).

In some arrangements, the authentication result indicates successful authentication in response to both (i) the handwriting evaluation result indicating that the user is authentic from the biometrics perspective and (ii) the code evaluation result indicating that the user is authentic from the code accuracy perspective. In these arrangements, the method further includes, in response to the authentication result indicating successful authentication, providing the user with access to a set of protected resources.

In some arrangements, the authentication result indicates unsuccessful authentication in response to at least one of (i) the handwriting evaluation result indicating that the user is not authentic from the biometrics perspective and (ii) the code evaluation result indicating that the user is not authentic from the code accuracy perspective. In these arrangements, the method further includes, in response to the authentication result indicating unsuccessful authentication, denying the user access to a set of protected resources.

In some arrangements, the processing circuitry and the electronic touch screen form portions of a mobile device. In these arrangements, the method further includes maintaining a local profile within the mobile device, the local profile including the expected set of user biometrics to enable effective local user authentication by the mobile device.

In some arrangements, the electronic touch screen forms a portion of a mobile device, and the processing circuitry resides at a remote authentication server. In these arrangements the method further includes outputting the authentication result from the remote authentication server to control the mobile device's access to a set of protected resources.

In some arrangements, the electronic touch screen forms a portion of a mobile device, and the mobile device performs sensing of the manually provided drawing gestures made by the user on the writing surface and converting of the manually provided drawing gestures into the set of touch screen parameters. In these arrangements, the processing circuitry resides at a remote authentication server, and receiving the handwritten code further includes acquiring set of touch screen parameters from the mobile device via wireless communications to perform authentication on the remote authentication server.

It should be understood that, in the cloud context, certain electronic circuitry is formed by remote computer resources distributed over a network. Such a computing environment is capable of providing certain advantages such as enhanced fault tolerance, load balancing, processing flexibility, etc.

Other embodiments are directed to electronic systems and apparatus, processing circuits, computer program products, and so on. Some embodiments are directed to various methods, electronic components and circuitry which are involved in authenticating a user.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to authenticating a user based on a handwriting evaluation which analyzes a set of biometric handwriting aspects of a handwritten code provided by the user. For example, the user can provide a personal identification number (PIN) or a one-time use passcode (OTP) by entering a series of user movements into an electronic touch screen. The value of the PIN/OTP can be evaluated as part of the authentication process. Additionally, the series of user movements is evaluated from a biometric perspective (e.g., screen coordinate locations, drawing pressure, drawing speed, acceleration, etc.) to determine whether the user is genuine. Accordingly, the improved technique incorporates a "who you are" factor into the authentication process (i.e., handwriting biometrics uniquely identify the legitimate user).

Figure 1:
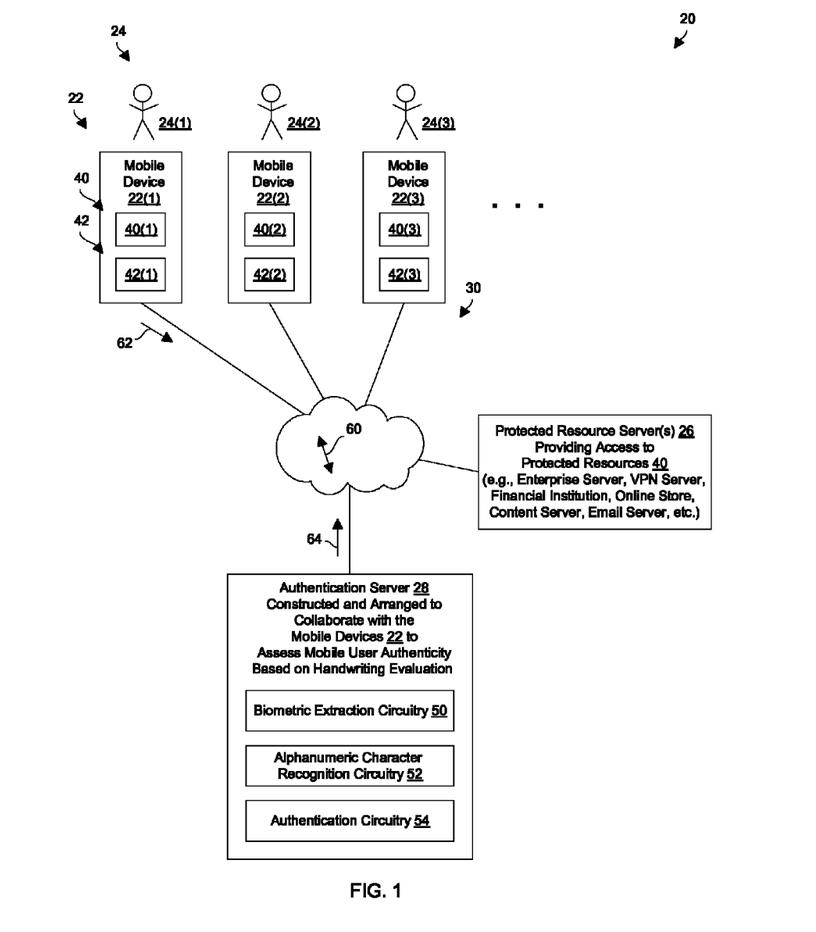
FIG. 1 is a block diagram of an electronic environment which is equipped for user authentication based on handwriting evaluation which analyzes sets of biometric handwriting aspects of handwritten codes.

FIG. 1 shows an electronic environment 20 which is suitable for user authentication based on handwriting evaluation which analyzes sets of biometric handwriting aspects of handwritten codes. The electronic environment 20 includes mobile devices 22(1), 22(2), 22(3), . . . (collectively, mobile devices 22) in possession of their respective users 24(1), 24(2), 24(3), . . . (collectively, users 24), a set of protected resource servers 26 (i.e., one or more protected resource servers 26), an authentication server 28, and a communications medium 30.

Each mobile device 22 includes an electronic touch screen 40 and a local set of protected resources 42. That is, the mobile device 22(1) includes an electronic touch screen 40(1) and a local set of protected resources 42(1), the mobile device 22(2) includes an electronic touch screen 40(2) and a local set of protected resources 42(2), and so on. The electronic touch screen 40 of each mobile device 22 is constructed and arranged to, among other things, acquire handwriting input from a user 24 by displaying a writing surface (e.g., an area on which a user 24 is to draw) and prompting the user 24 to write on the writing surface (e.g., using a finger, using a stylus, etc.). The set of protected resources 42 of each mobile device 22 is made available to the user 24 only when the user 24 successfully authenticates. Examples of suitable local protected resources 42 include user interface access (i.e., unlocking the mobile devices 22), app access, contact list access, access to stored content, access to particular local features such as a camera, a phone, and so on.

The set of protected resource servers 26 maintains other protected resources 42. Such protected resources 42 are capable of being accessed remotely by the mobile devices 22. Examples of suitable remote protected resources 42 include (among others) accounts and databases of enterprises, VPNs/gateways/other networks, account access and transaction access with banks/brokerages/other financial institutions, transaction access at online stores, databases containing movies/music/files/other content, access to email, access to online games, and so on.

The authentication server 28 performs authentication operations and communicates with the mobile devices 22 and the set of protected resource servers 26 to control access to the protected resources 42. Along these lines, authentication results from the authentication server 28 can be based on (i) handwriting evaluation (e.g., indicating whether a user 24 is authentic from a biometrics perspective) and (ii) code evaluation (e.g., indicating whether a user 24 is authentic from a code accuracy perspective). To this end and as shown in FIG. 1, the authentication server 28 includes biometric extraction circuitry 50 to extract user biometrics from user input obtained from the electronic touch screens 40 of the mobile devices 22, alphanumeric character recognition circuitry 52 to recognize alphanumeric codes from the user input, and authentication circuitry 54 to provide the authentication results based on this information. In some arrangements, the authentication server 28 is a component of a collaborative anti-Fraud network in which positive and/or negative authentication information (e.g., past authentication results, history, blacklists, etc.) is shared among different organizations/entities to enhance security among anti-Fraud network participants (e.g., to authentication effectiveness).

The communications medium 30 is constructed and arranged to connect the various components of the electronic environment 20 together to enable these components to exchange electronic signals 60 (e.g., see the double arrow 60). At least a portion of the communications medium 30 is illustrated as a cloud to indicate that the communications medium 30 is capable of having a variety of different topologies including backbone, hub-and-spoke, loop, irregular, combinations thereof, and so on. Along these lines, the communications medium 30 may include copper-based data communications devices and cabling, fiber optic devices and cabling, wireless devices, combinations thereof, etc. Furthermore, the communications medium 30 is capable of supporting LAN-based communications, SAN-based communications, cellular communications, combinations thereof, etc.

During operation, the users 24 operate their respective mobile devices 22 to perform useful work. Such work may include accessing one or more protected resources 42 (e.g., viewing a file, reading email, performing a banking transaction, etc.). Such operation may involve access to local protected resources 42 of the mobile devices 22 (e.g., access to certain apps, access to unlock the mobile devices, access to locally stored data, etc.). Alternatively or in combination, such operation may involve access to remote protected resources 42 of the external protected resource servers 26 (e.g., remote login access, remote access to content, ability to complete remote transactions, etc.). Other access control activities include installing apps, connecting to different networks, accessing enterprise resources, and so on. Some mobile devices 22 may be equipped with special peripherals that enable the users 24 to perform additional operations upon successful authentication such as make cellular calls, navigate using maps and GPS circuitry, take pictures, and so on.

During the course of such operation, the mobile devices 22 and the authentication server 28 collaborate to control access to the protected resources 42 based on handwriting evaluations which analyze sets of biometric handwriting aspects of handwritten codes provided by the users 24 (e.g., PINs, OTPs, other passwords, etc.). It should be understood that various parts of the authentication process can be performed on the mobile devices 22 and other parts of the authentication process can be performed on the authentication server 28. Accordingly, the mobile devices 22 and the authentication server 28 exchange signals (see arrows 62, 64 in FIG. 1) to coordinate their collaborative operation.

In some arrangements and/or situations, the authentication server 28 receives, from a mobile device 22, an authentication request which includes a set of touch screen parameters. In these arrangements, the authentication server 28 performs all evaluation operations to determine user authenticity. Such an arrangement/situation is effective when the mobile device 22 is online, i.e., when the mobile device 22 is able to communicate with the authentication server 28. Under these circumstances, the authentication result can be based on input from the mobile device 22 as well as external input (e.g., knowledge of malicious geo-locations, malicious IP addresses, malicious device identifiers, malicious transaction destinations, and so on).

In other arrangements and/or situations, some evaluation operations are performed by the mobile device 22 (e.g., alphanumeric character recognition, biometrics evaluation, etc.) and remaining evaluation operations are performed by the authentication server 28 (e.g., comparison of a current code to an expected code). Such a distributed processing arrangement/situation enables at least partial local processing to reduce communications bandwidth, but enables the authentication results to be based on external input as mentioned above.

In yet other arrangements and/or situations, evaluation operations are performed entirely by the mobile device 22. Such an arrangement/situation is suitable for use when the mobile device 22 is offline (e.g., unable to communicate with the communications medium 30 or the authentication server 28). Here, the authentication server 28 is simply involved in communicating information to the mobile device 22 (e.g., expected code, user data, updates to the authentication process, etc.) when connectivity exists.

In some arrangements, the mobile devices 22 try to perform authentication with the authentication server 28 if possible. If such authentication is not possible (e.g., if the network is down, if the mobile devices 22 are out of range or offline, etc.), the mobile devices 22 perform local authentication. Further details will now be provided with reference to FIG. 2.

Figure 2:
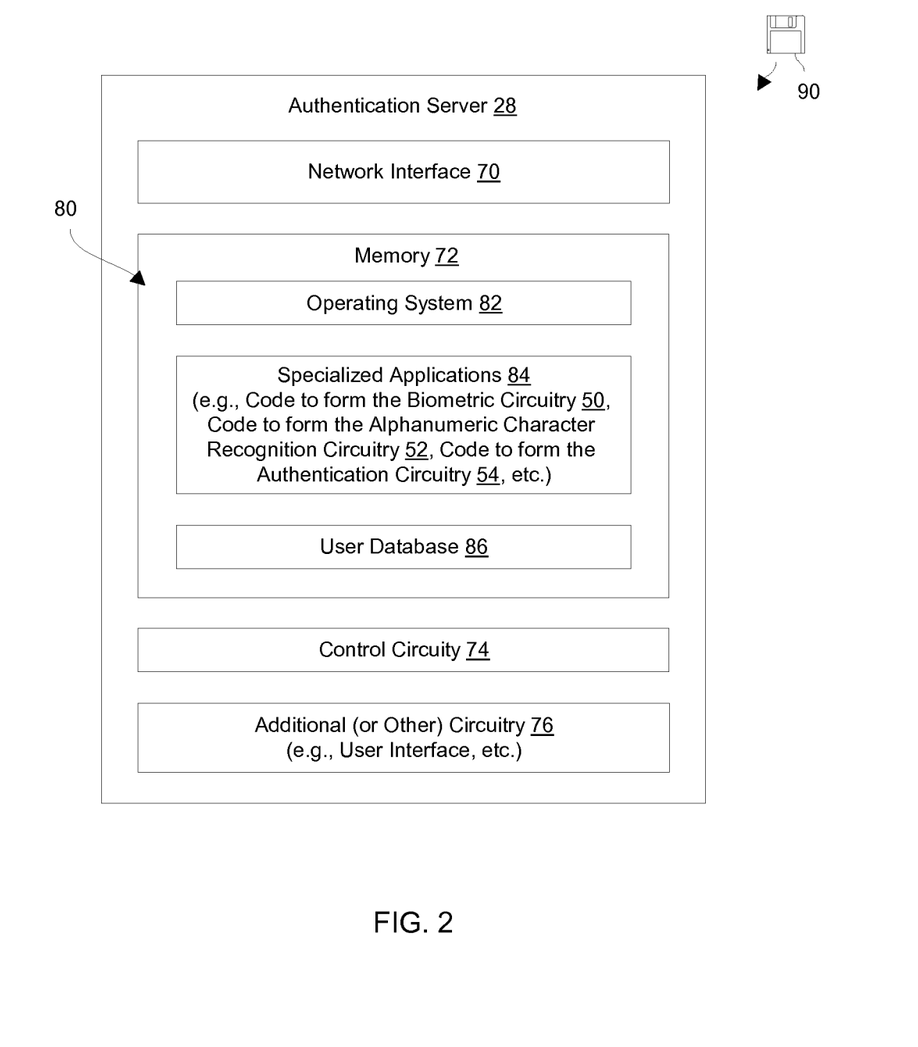
FIG. 2 is a block diagram of an authentication server of the electronic environment of FIG. 1.

FIG. 2 shows particular details of the authentication server 28 of the electronic environment 20. The authentication server 28 includes a network interface 70, memory 72, control circuitry 74, and additional (or other) circuitry 76.

The network interface 70 is constructed and arranged to connect the authentication server 28 to the communications medium 30. Accordingly, the network interface 70 enables the authentication server 28 to communicate with the other components of the electronic environment 20 (FIG. 1). Such communications may be copper-based, fiber-optic-based, or wireless (i.e., IP-based, SAN-based, cellular, Bluetooth, combinations thereof, and so on).

The memory 72 is intended to represent both volatile storage (e.g., DRAM, SRAM, etc.) and non-volatile storage (e.g., flash memory, magnetic disk drives, etc.). The memory 72 stores a variety of software constructs 80 including an operating system 82 to manage the computerized resources of the authentication server 28, specialized applications 84 to form the various circuitry 50, 52, 54 (FIG. 1) of the authentication server 28, a user database 86 to hold user information. Such user information can include user information (e.g., a user identifier, a username, contact data, etc.), user privileges (e.g., account information, a list of protected resources 42 which the user 24 owns, etc.), user biometric information, user PINs (or PIN hashes), user secrets/seeds for OTP derivation, user activity history, and so on.

The control circuitry 74 is constructed and arranged to operate in accordance with the various software constructs 80 stored in the memory 72. Such circuitry may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software to the authentication server 28. The computer program product 90 has a non-transitory (or non-volatile) computer readable medium which stores a set of instructions which controls one or more operations of the authentication server 28. Examples of suitable computer readable storage media include tangible articles of manufacture and apparatus which store instructions in a non-volatile manner such as CD-ROM, flash memory, disk memory, tape memory, and the like.

The additional (or other) circuitry 76 is optional and represents additional hardware that can be utilized by the authentication server 28. For example, the authentication server 28 can include a user interface (i.e., a console or terminal) enabling a human administrator to set up new users 24, to deal with alarms or warning messages, to administer routine maintenance, and so on. As another example, a portion of the authentication server 28 may operate as a source for distributing mobile device code during configuration/enrollment (e.g., an app store, a central app repository, etc.). Other components and circuitry are suitable for use as well.

During operation, the authentication server 28 runs in accordance with the specialized applications 84 to reliably and robustly control access to the protected resources 42 within the electronic environment 20. In particular, the authentication server 28 enrolls users 24 and stores the enrollment data in the user database 86. For example, the authentication server 28 can store, maintain and update the earlier-mentioned user information on behalf of the users 24 of the mobile devices 22.

In some arrangements, the users 24 go through an installation/training phase in which the users 24 configure their mobile devices 22 to properly communicate with the authentication server 28 in a trusted manner. During such a teaching phase, the users 24 input handwriting samples (e.g., draw their PINs, draw a variety of alphanumeric characters, etc.) to establish a baseline for future authentication. Further details will now be provided with reference to FIG. 3.

Figure 3:
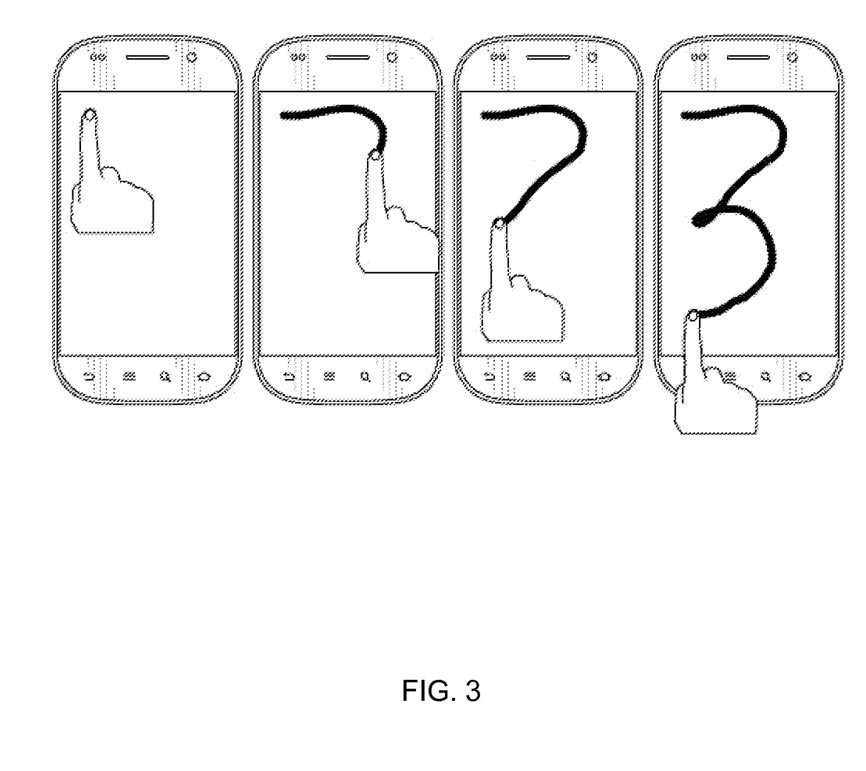
FIG. 3 is a diagram showing a series of drawing gestures made to an electronic touch screen of a mobile device of the electronic environment of FIG. 1.

FIG. 3 shows a series of drawing gestures that a user 24 makes on a writing surface displayed by an electronic touch screen 40 of a mobile device 22 (also see FIG. 1). By way of example, the user 24 is drawing the number "3".

To enter a digit or single character (e.g., a number, a letter, etc.), the user 24 moves a finger over the writing surface while contacting the writing surface. The user then moves the finger out of contact of the writing surface, and repeats the drawing process to enter another digit until the entire code is entered (e.g., a PIN, a OTP, a password, etc.).

During the drawing of each digit, the electronic touch screen 40 senses the manually entered drawing gestures and converts the gestures into a set of touch screen parameters. It should be understood that this output from the electronic touch screen 40 defines a set of locations as well as a set of user movement characteristics.

Processing circuitry (of the mobile device 22 or of the authentication server 28) then derives a code from the set of locations (also see the alphanumeric character recognition circuitry 52 in FIG. 1). For example, after the user finishes drawing each digit, the processing circuitry can perform a character recognition operation to derive that digit. The series of entered digits forms a current code (e.g., a PIN, a OTP, a password) which can then be compared to an expected code to evaluate user authenticity from a code accuracy perspective.

Additionally, the processing circuitry extracts a set of user biometrics from the set of user movement characteristics (also see the biometric extraction circuitry 50 in FIG. 1). Examples of suitable user biometric categories include actual coordinates (i.e., locations on a two-dimensional X-Y array), overall speed, X-axis speed, Y-axis speed, overall acceleration, X-axis acceleration, Y-axis acceleration, pressure, pressure divided by acceleration, pressure divided by speed, and so on. For certain user biometric categories, the processing circuitry is able to identify an average, a variance, a maximum, and so on. Other measurements, ratios, and derivable metrics are suitable for use as user biometrics as well.

The collection of user biometrics serves as a current "who you are" factor and can be compared to an expected set of user biometrics to evaluate user authenticity from a biometric perspective. Along these lines, the series of drawing gestures of FIG. 3 is different for different users 24. That is, the manner particular characters are drawn (e.g., sharp changes in direction, rounded curves, draws side to side, draws up or draws down, and so on) vary from user to user.

The authentication result is then based on the code accuracy evaluation as well as the biometric evaluation (also see the authentication circuitry 54 in FIG. 1). In connection with biometric evaluation, it should be understood that the set of user biometrics can be used for different machine learning algorithms (e.g., similarity computation, classification, clustering, combinations thereof, and so on).

One should appreciate that other forms of biometric authentication such as voice samples and/or images may require sending large samples to a verification server or may require performing difficult/complex processing on the user's smart device. However, with the above-described improved techniques, the handwriting information that is collected is much smaller (e.g., a few vectors of point locations, perhaps additional sensor information, etc.). Further details will now be provided with reference to FIGS. 4 and 5.

Figure 4:
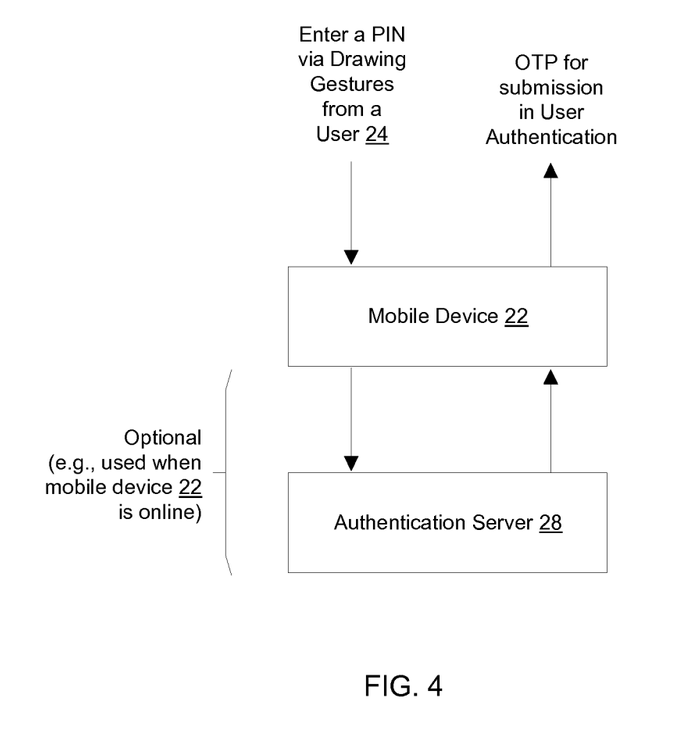
FIG. 4 is a block diagram of illustrating a first example use of the electronic environment of FIG. 1.
Figure 5:
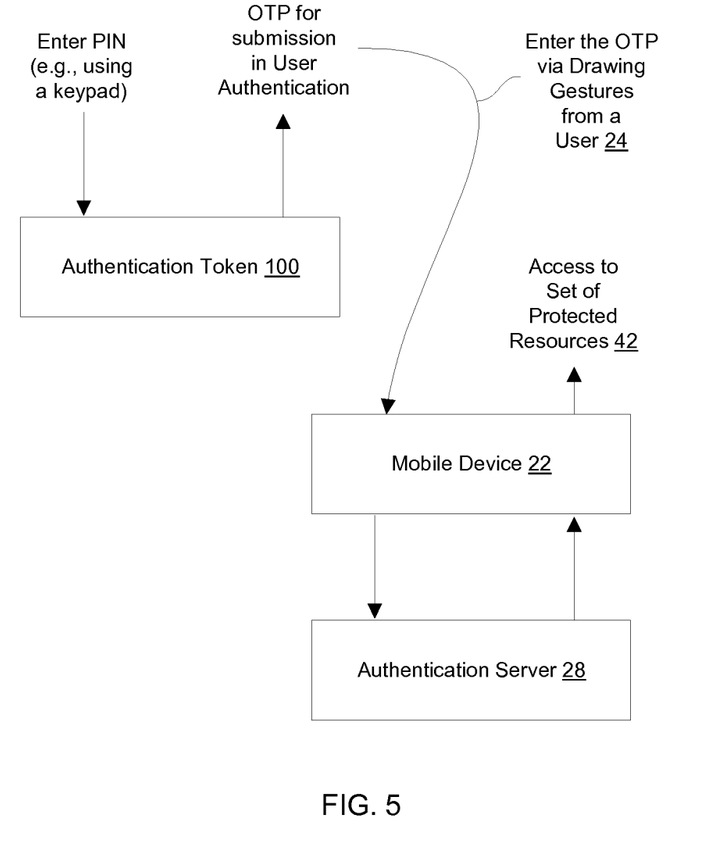
FIG. 5 is a block diagram of illustrating a second example use of the electronic environment of FIG. 1.

FIGS. 4 and 5 show different authentication scenarios. FIG. 4 shows a scenario in which a mobile device 22 operates as an authentication token (e.g., processing circuitry running code to form a soft token). FIG. 5 shows a scenario which involves a mobile device 22 and a separate hardware token 100.

As shown in the scenario of FIG. 4, the user 24 enters a current PIN into the mobile device 22. In particular, the user 24 draws the PIN on the electronic touch screen 40 (also see FIG. 3). A set of user biometrics is extracted from the user input, and a biometric evaluation is then performed on the set of biometrics. Concurrently, character recognition and code evaluation are then performed on the user input (also see authentication server 28 circuitry 50-54 in FIG. 1).

In some arrangements, the authentication server 28 performs the majority of the evaluation work if the mobile device 22 is online, i.e., if the mobile device 22 is able to communicate with the authentication server 28 (e.g., current data is matched to expected data based on earlier stored user information, also see the user database 86 in FIG. 2). In other arrangements, the mobile device 22 and the authentication server 28 distribute the work, e.g., the mobile device 22 performs character recognition, etc. In these arrangements, the mobile device 22 locally performs the biometric evaluation if the mobile device 22 is offline. Other arrangements and enhancements are suitable as well (e.g., when the mobile device 22 transitions to an online state from an offline state, the authentication server 28 can receive updated authentication history from the mobile device 22 as well as update a user profile which is stored for local user authentication on the mobile device 22).

If authentication is successful from both a code accuracy perspective and a biometrics perspective, the mobile device 22 returns a valid OTP to the user 24. In particular, the electronic touch screen displays the valid OTP enabling the user 24 to read the valid OTP and enter the valid OTP to obtain access to a set of protected resources 42. For example, the user 24 can provide the valid OTP to a protected resource server 26 via a web browser or other GUI to obtain access to a protected resource 42.

In some arrangements, if authentication is unsuccessful from either a code accuracy perspective, a biometrics perspective, or both, the mobile device 22 returns a fake (or bogus) OTP to the user 24. In particular, the electronic touch screen displays the fake OTP which cannot be used to gain access to the set of protected resources 42. Rather, the fake OTP is invalid and makes it more difficult for a malicious person to defeat security.

As shown in scenario of FIG. 5, the user 24 enters a current PIN into an authentication token 100 (e.g., a hardware token, a smart phone running code for a soft token, etc.). To this end, the user 24 can simply type the PIN using a keypad and, if the PIN is correct, the authentication token 100 returns a valid OTP.

Next, the user 24 reads the valid OTP from the authentication token 100 and draws the valid OTP on the electronic touch screen 40 of the mobile device 22 (also see FIG. 3). A set of user biometrics is extracted from the user input, and a biometric evaluation is then performed on the set of biometrics. Simultaneously, character recognition and code evaluation are also performed on the user input (see authentication server circuitry 50-54 in FIG. 1). If authentication is successful from both a code accuracy perspective and a biometrics perspective, the mobile device 22 provides access to a protected resource 42. However, if authentication is unsuccessful from a code accuracy perspective, a biometrics perspective, or both, the mobile device 22 denies access to the protected resource 42. Further details will now be provided with reference to FIG. 6.

Figure 6:
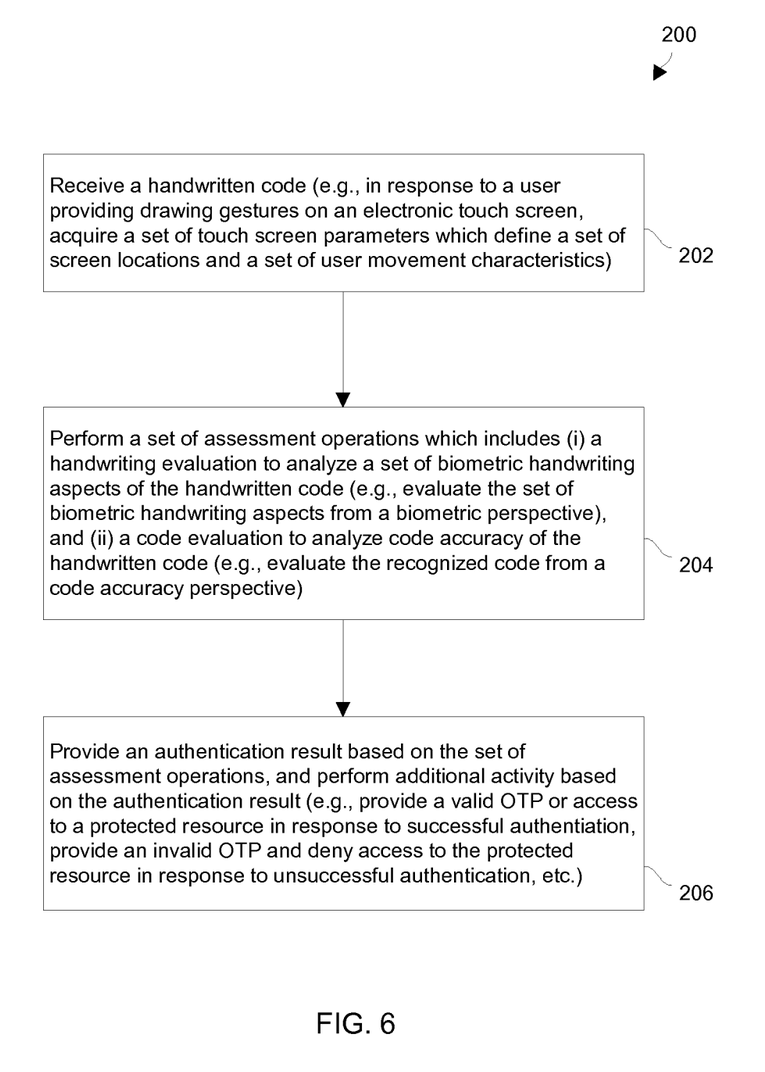
FIG. 6 is a flowchart of a procedure which is performed by an electronic apparatus which analyzes a set of biometric handwriting aspects of a handwritten code for user authentication.

FIG. 6 is a flowchart of a procedure 200 for performing user authentication which is performed by an electronic apparatus such as a mobile device 22 or an authentication server 28. At 202, the electronic apparatus receives a handwritten code. In particular, in response to a user 24 providing drawing gestures on an electronic touch screen 40, the electronic apparatus acquires a set of touch screen parameters which define a set of screen locations and a set of user movement characteristics.

At 204, the electronic apparatus performs a set of assessment operations which includes (i) a handwriting evaluation to analyze a set of biometric handwriting aspects of the handwritten code and (ii) a code evaluation to analyze code accuracy of the handwritten code. In particular, the electronic apparatus evaluates the set of biometric handwriting aspects from a biometric perspective to determine whether the user is authentic. Additionally, the electronic apparatus evaluates the recognized code from a code accuracy perspective to determine whether the user is authentic.

At 206, the electronic apparatus provides an authentication result based on the set of assessment operations, and performs additional activity based on the authentication result. In particular, in response to successful authentication, the electronic apparatus can return a valid OTP (e.g., in response to a multi-digit PIN), access to a protected resource 42 (e.g., in response to a multi-digit OTP), and so on. Furthermore, in response to unsuccessful authentication, the electronic apparatus can provide a fake OTP (e.g., in response to a PIN), can deny access to a protected resource 42 (e.g., in response to a OTP), etc. By providing a dummy OTP in response to unsuccessful authentication of an entered PIN, it is more difficult for a fraudulent user to try and learn how the real user usually draws the PIN.

As described above, improved techniques are directed to authenticating a user 24 based on a handwriting evaluation which analyzes a set of biometric handwriting aspects of a handwritten code provided by the user 24. For example, the user 24 can provide a PIN or a OTP by entering a series of user movements into an electronic touch screen 40 (i.e., drawing the PIN or OTP on the surface of the touch screen). The value of the PIN or OTP can be evaluated as part of the authentication process. Additionally, the series of user movements is evaluated from a biometric perspective (e.g., screen coordinate locations, drawing pressure, drawing speed, acceleration, etc.) to determine whether the user 24 is authentic or a fraudster. Accordingly, the improved techniques incorporate a "who you are" factor into the authentication process.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 such as the servers 26, 28 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that the handwriting information that is provided for biometric authentication can be combined with other data from the mobile device 22. For example, the mobile device 22 may be provisioned with other sensors such as accelerometers, gyroscopes, optical motion sensors, and other motion-sensitive circuits that can identify the angle at which the user 24 is holding the mobile device 22, etc. and such information can be included for evaluation as part of the biometric authentication process.

Furthermore, it should be understood that PIN code verification is not mandatory. Rather, in some arrangements, the process simply performs behavior verification by understanding one or more entered digits correctly based on handwriting on the screen (e.g., when someone draws a "1" on the screen it is understood via behavior verification that the digit is "1"). Such operation can be combined with other types of authentication such as multi-factor authentication, adaptive authentication (AA) or risk-based authentication, knowledge based authentication (KBA), new generation authentication (NGA), and so on. Such modifications and enhancements are intended to belong to various embodiments of the disclosure.

What is claimed is:

1. A method of authenticating a user, the method comprising:

receiving, by processing circuitry which includes a set of sensors, a handwritten code;

performing, by the processing circuitry, a set of assessment operations which includes (i) a handwriting evaluation to analyze a set of biometric handwriting aspects of the handwritten code and (ii) a code evaluation to analyze code accuracy of the handwritten code; and providing, by the processing circuitry, an authentication result based on the set of assessment operations;

wherein performing the set of assessment operations includes:

performing, as the handwriting evaluation, a first authentication operation which extracts handwriting biometric measurements during receipt of the handwritten code from the user and compares the extracted handwriting biometric measurements to earlier-obtained handwriting biometric measurements to determine whether the user is authentic from a handwriting biometric perspective, and performing, as the code evaluation, a second authentication operation which recognizes a personal identification code from the handwritten code and compares the recognized personal identification code to an expected personal identification code to determine whether the user is authentic from a handwritten password comparison perspective, the recognized personal identification code being a sequence of alphanumeric characters, the authentication result being based on the first authentication operation and the second authentication operation.

2. The method as in claim 1 wherein receiving the handwritten code includes:

obtaining, as the handwritten code, a set of touch screen parameters from an electronic touch screen which concurrently displays a writing surface and prompts a user to write on the writing surface.

3. The method as in claim 2 wherein obtaining the set of touch screen parameters includes:

sensing manually provided drawing gestures made by the user on the writing surface, and converting the manually provided drawing gestures into the set of touch screen parameters.

4. The method as in claim 3 wherein the set of touch screen parameters defines a current set of user movement characteristics; and wherein performing the first authentication operation includes:

extracting a current set of user biometrics from the current set of user movement characteristics, and based on a comparison between the current set of user biometrics and an expected set of user biometrics, generating a handwriting evaluation result indicating whether the user is authentic or a fraudster from the handwriting biometric perspective.

5. The method as in claim 4 wherein the set of touch screen parameters further defines a current set of screen locations; and wherein performing the second authentication operation includes:

performing a character recognition operation on the current set of screen locations to derive a current personal identification number (PIN), and based on a comparison between the current PIN and an expected PIN, generating a code evaluation result to indicate whether the user is authentic or a fraudster from the handwritten password comparison perspective.

6. The method as in claim 5 wherein the authentication result indicates successful authentication in response to both (i) the handwriting evaluation result indicating that the user is authentic from the handwriting biometric perspective and (ii) the code evaluation result indicating that the user is authentic from the handwritten password comparison perspective; and wherein the method further comprises:

in response to the authentication result indicating successful authentication, providing a valid one-time use passcode (OTP) to the user to enable the user to access to a set of protected resources using the OTP.

7. The method as in claim 5 wherein the authentication result indicates unsuccessful authentication in response to at least one of (i) the handwriting evaluation result indicating that the user is not authentic from the handwriting biometric perspective and (ii) the code evaluation result indicating that the user is not authentic from the handwritten password comparison perspective; and wherein the method further comprises:

in response to the authentication result indicating unsuccessful authentication, providing a fake one-time use passcode (OTP) to the user to prevent a fraudster from determining that authentication was unsuccessful.

8. The method as in claim 4 wherein the set of touch screen parameters further defines a current set of screen locations; and wherein performing the second authentication operation includes:

performing a character recognition operation on the current set of screen locations to derive a current one-time use passcode (OTP) which was outputted by an authentication token of assigned to the user, and based on a comparison between the current OTP and an expected OTP, generating a code evaluation result to indicate whether the user is authentic or a fraudster from the handwritten password comparison perspective.

9. The method as in claim 8 wherein the authentication result indicates successful authentication in response to both (i) the handwriting evaluation result indicating that the user is authentic from the handwriting biometric perspective and (ii) the code evaluation result indicating that the user is authentic from the handwritten password comparison perspective; and wherein the method further comprises:

in response to the authentication result indicating successful authentication, providing the user with access to a set of protected resources.

10. The method as in claim 8 wherein the authentication result indicates unsuccessful authentication in response to at least one of (i) the handwriting evaluation result indicating that the user is not authentic from the handwriting biometric perspective and (ii) the code evaluation result indicating that the user is not authentic from the handwritten password comparison perspective; and wherein the method further comprises:

in response to the authentication result indicating unsuccessful authentication, denying the user access to a set of protected resources.

11. The method as in claim 4 wherein the processing circuitry and the electronic touch screen form portions of a mobile device; and wherein the method further comprises:

maintaining a local profile within the mobile device, the local profile including the expected set of user biometrics to enable effective local user authentication by the mobile device.

12. The method as in claim 4 wherein the electronic touch screen forms a portion of a mobile device; wherein the processing circuitry resides at a remote authentication server; and wherein the method further comprises:

outputting the authentication result from the remote authentication server to control the mobile device's access to a set of protected resources.

13. The method as in claim 3 wherein the electronic touch screen forms a portion of a mobile device; wherein the mobile device performs sensing of the manually provided drawing gestures made by the user on the writing surface and converting of the manually provided drawing gestures into the set of touch screen parameters; wherein the processing circuitry resides at a remote authentication server; and wherein receiving the handwritten code further includes:
acquiring set of touch screen parameters from the mobile device via wireless communications to perform authentication on the remote authentication server.

14. The method as in claim 1, further comprising:
receiving a set of motion-related authentication factors from a set of motion-sensitive sensors, the authentication result being further based on the set of motion-related authentication factors.

15. The method as in claim 1 wherein providing the authentication result based on the set of assessment operations includes:
outputting, as the authentication result, (i) a first value to indicate successful authentication of the user when both the first authentication operation indicates that the user is authentic from the handwriting biometric perspective and the second authentication operation indicates that the user is authentic from the handwritten password comparison perspective, and (ii) a second value to indicate unsuccessful authentication of the user when either the first authentication operation indicates that the user is not authentic from the handwriting biometric perspective or the second authentication operation indicates that the user is not authentic from the handwritten password comparison perspective, the first value being different than the second value.

16. An electronic apparatus, comprising:
an interface which includes a set of sensors;
memory; and
control circuitry coupled to the interface and the memory, the memory storing instructions which, when carried out by the control circuitry, cause the control circuitry to:
receive a handwritten code through the interface,
perform a set of assessment operations which includes (i) a handwriting evaluation to analyze a set of biometric handwriting aspects of the handwritten code and (ii) a code evaluation to analyze code accuracy of the handwritten code, and
provide an authentication result based on the set of assessment operations;
wherein the control circuitry, when performing the set of assessment operations, is constructed and arranged to:
perform, as the handwriting evaluation, a first authentication operation which extracts handwriting biometric measurements during receipt of the handwritten code from the user and compares the extracted handwriting biometric measurements to earlier-obtained handwriting biometric measurements to determine whether the user is authentic from a handwriting biometric perspective, and
perform, as the code evaluation, a second authentication operation which recognizes a personal identification code from the handwritten code and compares the recognized personal identification code to an expected personal identification code to determine whether the user is authentic from a handwritten password comparison perspective, the recognized personal identification code being a sequence of alphanumeric characters, the authentication result being based on the first authentication operation and the second authentication operation.

17. The electronic apparatus as in claim 16 wherein the control circuitry, when receiving the handwritten code, is constructed and arranged to:
obtain, as the handwritten code, a set of touch screen parameters from an electronic touch screen which concurrently displays a writing surface and prompts a user to write on the writing surface.

18. The electronic apparatus as in claim 17 wherein the control circuitry, when obtaining the set of touch screen parameters, is constructed and arranged to:
sense manually provided drawing gestures made by the user on the writing surface, and converting the manually provided drawing gestures into the set of touch screen parameters.

19. The electronic apparatus as in claim 18 wherein the set of touch screen parameters defines a current set of user movement characteristics; and wherein the control circuitry, when performing the first authentication operation, is constructed and arranged to:
extract a current set of user biometrics from the current set of user movement characteristics, and
based on a comparison between the current set of user biometrics and an expected set of user biometrics, generate a handwriting evaluation result indicating whether the user is authentic or a fraudster from the handwriting biometric perspective.

20. The electronic apparatus as in claim 17 wherein the interface, the memory, the control circuitry, and the electronic touch screen are disposed within a mobile device form factor to enable local biometric assessment of the user.

21. The electronic apparatus as in claim 17 wherein the electronic touch screen resides on a mobile device; and
wherein the interface, the memory, the control circuitry reside on authentication server equipment which is external to the mobile device to enable authentication of multiple users simultaneously.

22. A computer program product having a non-transitory computer readable medium which stores a set of instructions to authenticate a user, the set of instructions, when carried out by computerized circuitry which includes a set of sensors, causing the computerized circuitry to perform a method of:
receiving a handwritten code;
performing a set of assessment operations which includes (i) a handwriting evaluation to analyze a set of biometric handwriting aspects of the handwritten code and (ii) a code evaluation to analyze code accuracy of the handwritten code; and
providing an authentication result based on the set of assessment operations;
wherein performing the set of assessment operations includes:
performing, as the handwriting evaluation, a first authentication operation which extracts handwriting biometric measurements during receipt of the handwritten code from the user and compares the extracted handwriting biometric measurements to earlier-obtained handwriting biometric measurements to determine whether the user is authentic from a handwriting biometric perspective, and
performing, as the code evaluation, a second authentication operation which recognizes a personal identification code from the handwritten code and compares the recognized personal identification code to an expected personal identification code to determine whether the user is authentic from a handwritten password comparison perspective, the recognized personal identification code being a sequence of alphanumeric characters, the authentication result being based on the first authentication operation and the second authentication operation.

\* \* \* \* \*